United States Patent [19]

Felder

[11] Patent Number: 4,572,353
[45] Date of Patent: Feb. 25, 1986

[54] REVERSIBLE STOW CONVEYOR TRACK

[75] Inventor: Christian Felder, Dreieichenhain, Fed. Rep. of Germany

[73] Assignee: Gebhardt Fordertechnik GmbH, Fed. Rep. of Germany

[21] Appl. No.: 461,139

[22] Filed: Jan. 25, 1983

[30] Foreign Application Priority Data

Jan. 26, 1982 [DE] Fed. Rep. of Germany ....... 3202382

[51] Int. Cl.⁴ ............................................. B65G 37/00
[52] U.S. Cl. ................................... 198/577; 198/781; 198/784; 198/789; 74/404
[58] Field of Search ............... 198/781, 790, 789, 791, 198/783, 784, 810, 857, 572, 371, 577, 631; 74/404; 474/1, 2

[56] References Cited

U.S. PATENT DOCUMENTS

| | | | |
|---|---|---|---|
| Re. 15,626 | 6/1923 | Plonka | 198/371 |
| 2,701,049 | 2/1955 | Kendall et al. | 198/577 |
| 3,537,569 | 11/1970 | Leach | 198/781 |
| 3,842,962 | 10/1974 | Grachev et al. | 198/783 X |
| 3,933,237 | 1/1976 | Rotterman | 198/572 X |
| 4,215,775 | 8/1980 | Gebhardt | 198/781 |
| 4,291,796 | 9/1981 | Gebhardt | 198/781 X |

*Primary Examiner*—Joseph E. Valenza
*Assistant Examiner*—Jonathan D. Holmes
*Attorney, Agent, or Firm*—Craig and Burns

[57] ABSTRACT

A reversible conveyor wherein transmission of power is effected by a driving source to the conveyor, the conveyor being divided into two sections, wherein intermediate rollers are thrown from a drive position to a neutral position by a unit-load-controlled sensor in order to stop the unit load. Reversibility of the conveyor track is effected by placing in each section of the conveyor two intermediate rollers which act in opposite directions but always with only one of the intermediate rollers assuming the drive position.

7 Claims, 13 Drawing Figures

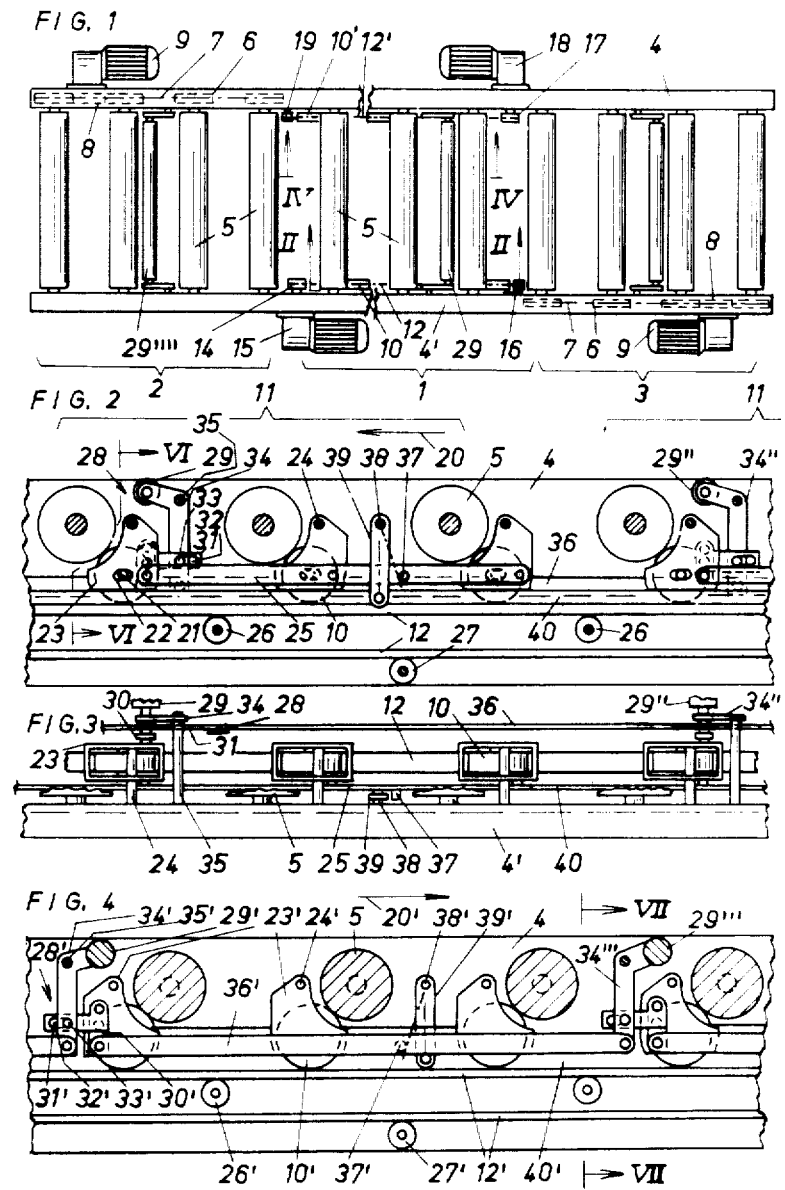

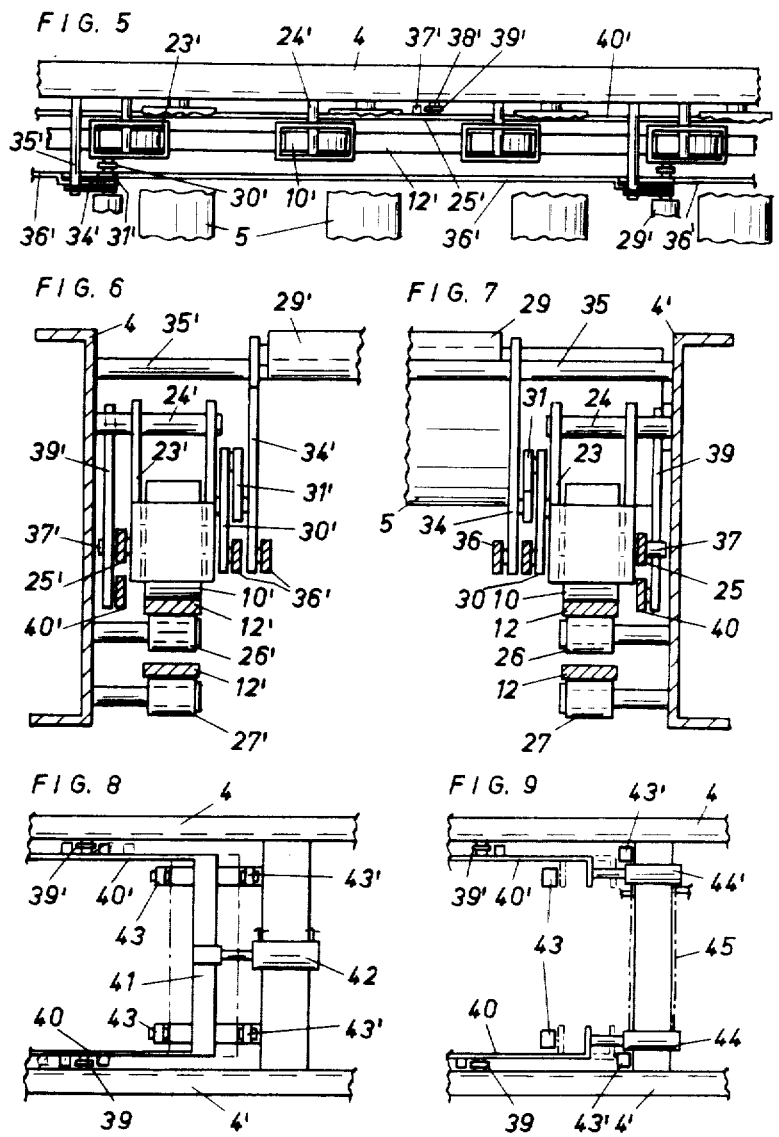

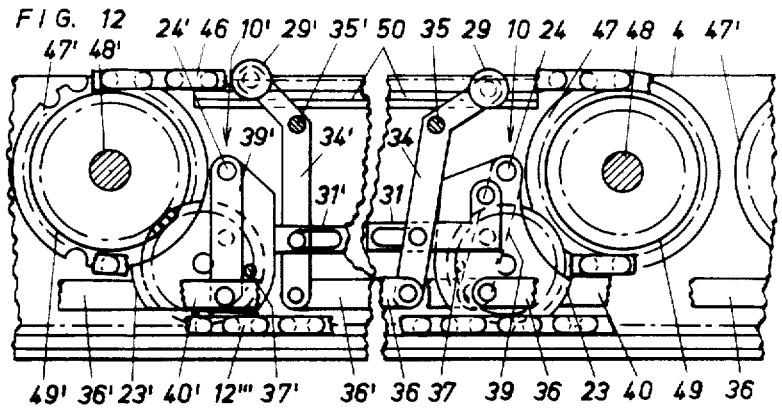
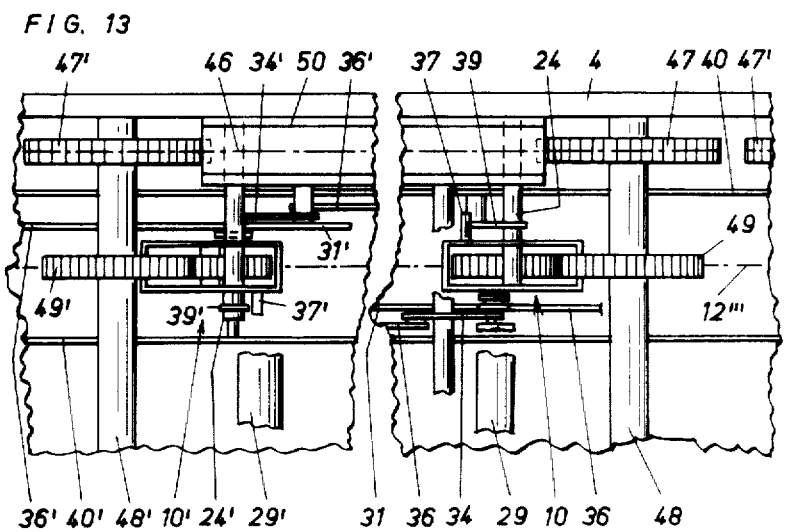

REVERSIBLE STOW CONVEYOR TRACK

The invention relates to a reversible stow conveyor track for conveying unit loads having a conveyor means arranged between longitudinal frames and divided into sections, each of which is driven by at least one intermediate roller which is driven by a rotating driving means, wherein the intermediate roller of each section is connected by a control linkage to a sensor which can be actuated by the unit load and can be switched from a drive position to a neutral position.

A stow conveyor track in the form of a stow roller track is well known as exemplified by West German Unexamined Laid-Open Application 205 2 418, wherein the rotating supporting rollers carrying the unit loads can be connected in the manner of a drive to a continuously rotating driving means through an adjustable intermediate roller. The intermediate rollers are divided into sections, each group of rollers being thrown by a unit-load-controlled sensor from the drive position to the neutral position. Upon deactivation of the sensor, the intermediate rollers resume their drive position. Resetting takes place by means of the rotating driving means. A spring may also be provided as an accessory. Thus, the full driving power can be transmitted by the driving means to the supporting rollers in one direction of conveyance only. In the other direction of conveyance, only the spring could cause the intermediate rollers to press moderately against the driving means and the supporting rollers. However, this does not produce a significant power transmission, i.e., conveying capacity. Thus, the slow conveyor track of prior construction can be used only in one direction of conveyance.

Therefore, the invention is for the purpose of improving a stow conveyor track in such a way that it can be used in both directions of conveyance with the same conveying and stowing effect.

According to the invention, this is achieved by providing each section of the conveyor means with at least two intermediate rollers which act thereon in opposite directions of conveyance, with one intermediate roller always assuming the drive position.

The advantages that can be achieved with the invention are particularly seen in the fact that a stow conveyor track equipped in this fashion works in both directions of conveyance with the same conveying capacity and the same stowing effect. Thus, such a stow conveyor track can be charged and discharged in both directions at the same speed. Therefore, it can be used as a depot that can be charged on both sides, so that the range of applications can be increased significantly. On the other hand, the design and mode of operation are simple. Thus, the reversible stow conveyor track embodying the invention increases the field of applications of such a depot considerably.

Accordingly, it is an object of the invention to provide an improved reversible stow conveyor.

It is a further object of the invention to provide an improve reversible stow conveyor which can be used in both directions of conveyance with the same conveying and stowing effect.

It is another object of the invention to provide an improved reversible stow conveyor wherein each section of the conveyor means is provided with at least two intermediate rollers which act upon the conveyor means in opposite directions of conveyance, with one intermediate roller always assuming the drive position.

It is another object of the invention to provide an improved reversible stow conveyor track for continuous conveying and stowing of unit loads having a conveyor means arranged between longitudinal frames and divided into sections, each section being driven by at least one intermediate roller which is driven by a rotating driving means, wherein said intermediate roller of each section is connected by a control linkage to a sensor which can be actuated by the unit load and can be switched from a drive position to a neutral position, each section of the conveyor means having at least two intermediate rollers which act upon the conveyor means in opposite directions of conveyance, wherein one intermediate roller always assumes the drive position.

It is another object of the invention to provide an improved stow conveyor track with intermediate roller wherein the driving means for the intermediate roller which is not in the drive position is driven in a direction opposite to the direction of conveyance.

It is another object of the invention to provide an improved stow conveyor track wherein an intermediate roller which is not needed in the drive position is thrown to a neutral position by means of power-assisted slide rails and held there.

It is another object of the invention to provide an improved reversible stow conveyor track having intermediate rollers wherein both intermediate rollers are mounted on a conveyor means transverse-offset to one another and are each driven by a rotating driving means.

It is another object of the invention to provide a reversible stow conveyor track system having at least plural driving means wherein at least two of the driving means rotate in the same direction.

It is another object of the invention to provide a reversible stow conveyor track system having plural intermediate rollers mounted opposite each other on a conveyor means, the rollers rolling together on a driving means which can be driven in at least one of two directions.

It is another object of the invention to provide a stow conveyor track system having a sensor means which preselects a particular direction of conveyance.

It is another object of the invention to provide a stow conveyor track system having a conveyor means comprising a belt or chain and rotatable in sections, wherein, viewed in a particular direction of conveyance, one intermediate roller thereof and its sensor are placed ahead of an output-side shaft of deflection gears for the conveyor means, the intermediate rollers meshing in the drive position with a gear which is connected with a deflection gear.

These and other objects, features, and advantages of the present invention will become more apparent from the following description when taken in connection with the accompanying drawings which show, for the purposes of illustration only, one embodiment in accordance with the present invention, and wherein:

FIG. 1 is a top view of the reversible stow conveyor track;

FIG. 2 is a cross-sectional view taken along the line II—II of FIG. 1;

FIG. 3 is a top view of the cross-sectional view of FIG. 2;

FIG. 4 is a cross-sectional view taken along the line IV—IV of FIG. 1;

FIG. 5 is a top view of the cross-sectional view of FIG. 4;

FIG. 6 is an enlarged cross-sectional view taken along the line VI—VI of FIG. 2;

FIG. 7 is an enlarged cross-sectional view taken along the line VII—VII of FIG. 4;

FIG. 8 is a top view of a setting mechanism;

FIG. 9 is a top view of another design of the setting mechanism;

FIG. 12 is a view of another form of application;

FIG. 13 is a top view of the design of FIG. 12.

Figure 10:
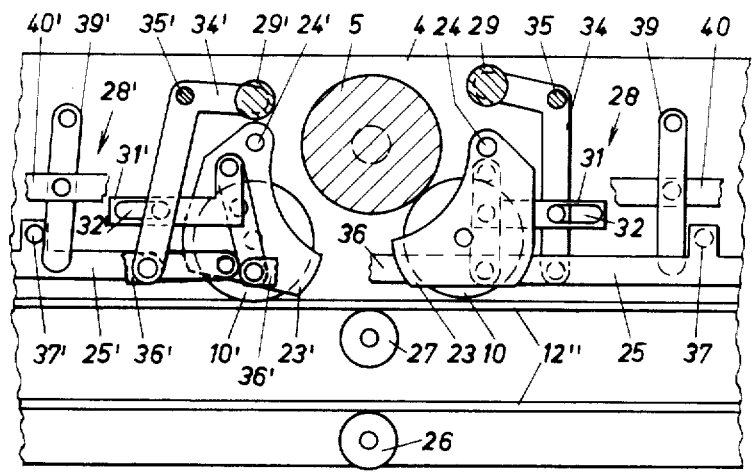
FIG. 10 is a view of another design of the stow roller track.

With reference to the figures wherein like elements are designated by the like reference numerals, FIG. 1 shows a conveyor track as a specific embodiment of a reversible stow roller track for storing and for either delivering or discharging unit loads in one or the other direction of conveyance. It consists of a stow roller track 1 to whose ends are each connected an end roller track 2 and 3. The entire conveyor track has parallel longitudinal members 4 and 4' between which supporting rollers 5 are pivoted as conveyor devices crosswise to the direction of conveyance. Supporting rollers 5 of the end roller tracks 2 and 3 are fixedly connected to driving gears over which a belt 7 or the like is laid. The latter also winds around a driven gear 8 of a motor 9 so that when this motor 9, which can be driven in either one or the other direction of rotation, is switched on, all supporting rollers 5 of end roller tracks 2 and 3 also rotate in one or the other direction.

Each supporting roller 5 of stow roller track 1 has two intermediate rollers 10 and 10' which are mounted radially on both sides, each of which rolls on a rotating driving means 12 and 12' such as, for example, a belt, a chain, or the like. Driving means 12 is reversed at one end of stow roller track 1 by driving gear 14 of a geared motor 15, and at the other end by a deflection gear 16 mounted on longitudinal member 44', FIG. 9. Driving means 12' is laid over driving gear 17 of geared motor 18 and over deflection gear 19. Geared motor 15 is mounted across from deflection gear 19, and geared motor 18 is mounted across from deflection gear 16. Both geared motors 15 and 18 can be switched on to drive in one or the other direction.

FIGS. 2, 3 and 7 show the arrangement of supporting rollers 10 which are mounted on an end face of supporting roller 5 and are pressed counterclockwise against supporting roller 5 during the rotation of driving means 12, so that the latter is also rotated counterclockwise. A unit load located on supporting rollers 5 is then conveyed from right to left in the direction of arrow 20. Intermediate roller 10 is mounted with an axle 21 in a substantially horizontal slot 22 of a housing 23 with allowance for radial play. Housing 23 can pivot about stud 24 which is mounted above slot 22 and is secured to longitudinal member 4'. Supporting rollers 5 and, thereby, intermediate rollers 10 are combined into sections 11. The length of sections 11 depends on a suitable number of unit loads which are to be conveyed and stowed and comprises supporting rollers 5 and intermediate rollers 10 and 10'. Housings 23 of each section 11 are hinged together to a connecting rail 25 and are thus interconnected. Underneath intermediate rollers 10, driving means 12 is carried by supporting rollers 26, while the slack side is guided via casters 27.

Each section 11 of intermediate rollers 10 is connected by a control linkage 28 to a sensor 29 constructed, for example, as a guide roller and normally extending into the track of the unit load. It is pressed downward by the unit loads during the rolling over. In this way, the connected section 11 of intermediate rollers 10 is pressed into a neutral position (in FIG. 1 to the right), thereby interrupting the drive. Control linkage 28 consists of an intermediate lever 30 which is hinged, approximately in the middle, to one of housings 23 of section 11. An angle lever 31 is pivoted on a stud at the upper end of intermediate lever 30.

On the lever arm of angle lever 31 which is in the opposite direction, approximately horizontally, of housing 23, there is provided a slot 32 into which extends a pin 33 of a sensor lever 34 which carries the sensor 29 and is offset at the top of the direction of conveyance. The latter is swivel-mounted on longitudinal members 4 and 4' about an axis 35. At the bottom of intermediate lever 30 there is hinged a rod 36 which is guided in the direction of conveyance indicated by arrow 20 to sensor 29 of the section 11 located therebefore and hinged there at the lower end of sensor lever 34. On connecting rail 25 there is fastened a stud 37 on which bears a switch lever 39 swivelling about an axis 28 on longitudinal member 4' when it is swung counterclockwise, as indicated by the dot-dash line. Switch lever 39 is hinged at its lower end to a slide rail 40 which extends over several sections 11, preferably throughout the length of stow roller track 1.

On supporting rollers 5 there is mounted radially on the other side and at the other end face another intermediate roller 10' with a control linkage 28' which is connected with a sensor 29'.

The arrangement, design and function correspond to those described and shown in FIGS. 4, 5 and 6. Hence, like signs denote like parts which are only distinguished by a prime symbol ('). Driving means 12' rotates clockwise to convey in the direction indicated by arrow 20', that is to say, opposite to the direction of arrow 20. Accordingly, switch lever 39' is swung counterclockwise in order to release all intermediate rollers 10', as shown by the dot-dash line in FIG. 4.

For example, both slide rails 40 and 40' are interconnected at both ends by a crossbar 41 which can be actuated by a servomotor 42, e.g., a pneumatic actuating cylinder, to one of the two end positions indicated by the dot-dash line, as shown in FIG. 8. The end positions are determined by stops 43 and 43', which are preferably adjustable. In the left end position with abutment against stops 43, the studs 37' and thereby the connecting rails 25', and in the end position with abutment against stops 43', the studs 37 with connecting rails 25, are shifted to the particular neutral position. Instead of crossbar 44 or 44', any slide rail 40 and 40' can have its own servomotor 44 or 44', so that they always work in the same direction, that is to say, both slide rails 40 and 40' abut against stops 43 or stops 43' as shown, for example, in FIG. 9.

It is readily apparent that a unit load can be conveyed on a stow roller track 1 either via end roller track 2 or via end roller track 3. For example, if a unit load is fed in via end roller track 2, its sensor 29'''', FIG. 1, transmits a signal to servomotor 42 or 44, 44' so that the latter throws slide rails 40 and 40' to the right end position so as to abut against stops 43'. In this end position, all intermediate rollers 10 are switched to their neutral position so that only intermediate rollers 10' can drive supporting rollers 5. Both driving means 12 and 12' can rotate continuously in opposite directions, that is to say, driving means 12 in counterclockwise direction and driving means 12' in clockwise direction. It goes without saying that only the necessary driving means can be thrown into gear, driving means 12' in the example. As long as no unit load is stored, the unit load that is to be stored continues to be routed onward. On the other hand, if a unit load is already on stow roller track 1, a sensor, e.g., sensor 29''', FIG. 4, is pressed downward, that is to say, sensor lever 34''' is pivoted counterclockwise. As a result, intermediate lever 30' of the section located therebehind is rotated clockwise via rod 36', so that angle lever 31' is moved to the right and slot 32' comes to the other end position. Thus, pin 33' of sensor lever 34' lies on the left end of slot 32'. Now, when sensor 29' is also pressed downward by the incoming unit load, then, by pivoting sensor lever 34' clockwise, housing 23' and, thereby, all housings 23' of the section are pivoted clockwise so that the intermediate rollers 20' mounted therein are moved from supporting roller 5, and the latter and, thereby, the unit load, stop moving.

Now, if the unit loads are to be conveyed in the opposite direction, that is, from right to left in the direction of arrow 20 in FIG. 2, then both slide rails 40 and 40' are moved to the left to the end position so as to abut against stop 43. Intermediate rollers 10' are then lifted off supporting rollers 5 and intermediate rollers 10 abut, or remain, in the neutral position when sensors 29 are pressed down by the unit loads. The conveying and stowing occur in the manner described above. Needless to say that the resetting of intermediate rollers 10 and 10' or of sensors 29 and 29' can be assisted by springs.

Figure 11:
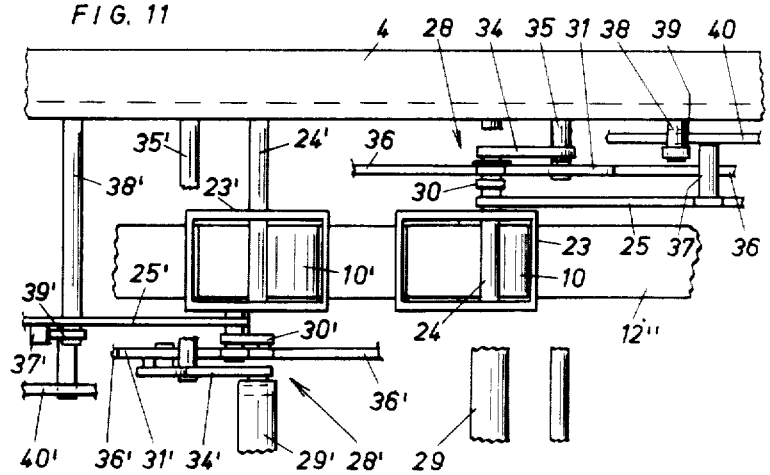
FIG. 11 is a top view of the stow roller track of FIG. 10.

In the further development shown in FIGS. 10 and 11, the intermediate rollers 10 and 10' are mounted adjacent supporting roller 5 radially opposed to one another and both rolling on the same driving means 12". Here, too, the arrangement and design features correspond to those described earlier, so that like signs denote like parts. The control linkages 28 and 28' assigned to intermediate rollers 10 and 10' are placed completely on one side of housings 23 and 23'. Only the direction of rotation of driving means 12" has to be reversed when the direction of conveyance is changed. FIG. 10 shows intermediate roller 10 in the drive position and intermediate roller 10' in the neutral position. The direction of conveyance is shown from right to left, that is to say, driving means 12" rotates counterclockwise. Upon switching slide rails 40 and 40' to the other direction of conveyance, they are moved to the right to that intermediate rollers 10' are released and intermediate rollers 10 are lifted off the supporting roller 5. Simultaneously, the direction of rotation of driving means 12" is reversed.

In certain cases, for example in the case of slowly running conveyor tracks, the forcible switching of intermediate rollers 10 and 10' by slide rails 40 and 40' can be dispensed with if care is exercised that the non-working intermediate rollers 10 or 10' are prevented by the driving means 12 or 12', which runs counter to the direction of conveyance, from gripping between supporting roller 5 and driving means 12 or 12'.

If two driving means 12 and 12' are provided, as shown in the specific embodiment of FIGS. 1 to 7, then the two driving means 12 and 12' must always rotate in the same direction and their direction of rotation must also be reversed with the direction of conveyance is changed. If only one driving means 12" is provided, as shown in the specific embodiment of FIGS. 10 and 11, then the same effect is achieved by the inherently required switching of the direction of rotation.

It will be understood that the invention is not limited to one stow roller track. It can also be used in any stow conveyor track with a different conveyor means, e.g., in belt or chain conveyors.

FIGS. 12 and 13 show a specific embodiment for use in a chain conveyor. Again, like signs denote like parts. The common driving means 12''' for intermediate rollers 10, 10' is designed as a constantly rotating chain. A chain 46 which runs at the top along a supporting section 50 and is deflected at the section ends by deflection gears 47 and 47' serves as conveying device for the unit load in each section of the stow conveyor track. It stands to reason that at least two chains are mounted parallel to one another and are each guided via deflection gears 47 and 47' resting on a common shaft 48 and 48'. Furthermore, there is fastened to each shaft 48, 48' a gear 49, 49' into which intermediate roller 10, 10', which is likewise designed as a gear, engages in the drive position. Intermediate rollers 10 and 10' are pivoted in housings 23 and 23' which swivel about studs 24 and 24'. Intermediate rollers 10 and 10' are shifted by the associated sensors 29 and 29' in the manner described earlier. In each section, a sensor 29 is mounted near deflection gear 27 for the direction of conveyance from left to right, and a sensor 29' ahead of deflection gear 47' for the direction of conveyance from right to left. Accordingly, an intermediate roller 10 or 10' is provided for each direction of conveyance. The deactivation of the intermediate roller 10 or 10' which is not needed occurs, for example, by means of the switch levers 39 and 39' which are, for example, pivotally mounted on stud 24 or 24' of housings 23 and 23', said switch levers 39 and 39' being hinged, respectively, to power-assisted sliding rails 40 and 40' and, as they swivel, abutting against, respectively, housing 23 and 23'. It is readily apparent that intermediate rollers 10, as described earlier, are shifted to the neutral position and held therein by swivelling then switch levers 39 clockwise to the neutral position, causing them to abut against studs 37. The same is true for intermediate rollers 10' by swivelling the switch levers 39' counterclockwise, so that by abutting against studs 37' the intermediate rollers 10' are pivoted out counterclockwise. The shifting of switch levers 39 and 39' or of the slide rails 40 and 40' thereof occur in the manner described above, with the travel direction of driving means 12''' also being reversed in the process. It will be understood that each intermediate roller 10 and 10' may also have its own driving means 12''''.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

What is claimed is:

1. A reversible stow conveyor system for continuous conveying and stowing of unit loads having a conveyor means arranged between longitudinal frames and divided into sections, each section being driven by at least one intermediate roller which is driven by a rotating driving means, wherein said intermediate roller of each section is connected by a control linkage to a sensor which can be actuated by the unit load and can be switched from a drive position to a neutral position, characterized in that each section of the conveyor means has at least two intermediate rollers which act upon the conveyor means in opposite directions of conveyance, wherein one intermediate roller always assumes the drive position.

2. The stow conveyor track system as set forth in claim 1, characterized in that the driving means of the intermediate roller which is not in the drive position is driven in a direction opposite to the direction of conveyance.

3. The stow conveyor track system as set forth in claim 1 characterized in that the intermediate roller which is not needed in the drive position is thrown to the neutral position by means of power-assisted slide rails and held there.

4. The stow conveyor track system as set forth in claim 1, characterized in that both intermediate rollers are mounted on the conveyor means transversely offset relative to one another and are each driven by a rotating driving means.

5. The stow conveyor track system as set forth in claim 1, characterized in that both driving means rotate in the same direction.

6. The stow conveyor track system as set forth in claim 1, characterized in that the intermediate rollers are mounted opposite each other on the conveyor means and roll together on a driving means which can be driven in one or the other direction.

7. The stow conveyor track system as set forth in claim 1, characterized in that the particular direction of conveyance is preselected by a sensor means which is connected to be activated by said unit load before the latter contacts an intermediate roller.

* * * * *